US012619751B1

(12) United States Patent
Muncy

(10) Patent No.: US 12,619,751 B1
(45) Date of Patent: May 5, 2026

(54) RECONSTRUCTIVE INTROSPECTION OF APPLICATION FLOWS

(71) Applicant: Amazon Technologies, Inc., Seattle, WA (US)

(72) Inventor: Matthew Lee Muncy, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 443 days.

(21) Appl. No.: 18/067,685

(22) Filed: Dec. 16, 2022

(51) Int. Cl.
*G06F 21/62* (2013.01)
(52) U.S. Cl.
CPC ................................. *G06F 21/6218* (2013.01)
(58) Field of Classification Search
CPC ............. G06F 2201/87; G06F 2201/84; G06F 2201/865; G06F 2201/86; G06F 2201/835; G06F 11/3636; G06F 11/3476; G06F 11/1471; G06F 11/323; G06F 11/3612; G06F 11/3006; G06F 21/577; G06F 2221/2101; H04L 43/026; H04L 45/38; H04L 63/1416
See application file for complete search history.

(56) References Cited

U.S. PATENT DOCUMENTS

| | | | |
|---|---|---|---|
| 2018/0129579 A1 | 5/2018 | Debnath et al. | |
| 2018/0268312 A1 | 9/2018 | Zhang et al. | |
| 2021/0011832 A1* | 1/2021 | Togawa | ............... G06F 11/3476 |
| 2022/0382617 A1* | 12/2022 | Tiwari | ............... H04L 63/1425 |

* cited by examiner

*Primary Examiner* — Brian F Shaw
(74) *Attorney, Agent, or Firm* — S. Scott Foster; Kowert, Hood, Munyon, Rankin & Goetzel, P.C.

(57) ABSTRACT

Applications using complex interactions among networked services may have flows reconstructed through analysis of trace logs of the services. Logs collected independently and absent knowledge of other logs or flows may be parsed by an adaptive parser to identify service events which may be temporally organized using timestamps and performance metrics collected during previous usage of the services. Analyzing these temporally organized events may produce a list of independent candidate events that may associated with an application flow. These candidate events may then be sorted based on key identifiers in the events according to previously established application facts with identifiers of events correlated to reconstruct the application flow. The reconstructed flow may then be provided for stored, visualized, replayed or provided as input to a topology generator for further introspection.

18 Claims, 5 Drawing Sheets

Receive a request to reconstruct an application flow. 400

Load independently generated trace logs from multiple application services. 410

Parse the loaded trace logs using an adaptive parser to generate a set of service events. 420

Temporally categorize the system events according to respective performance metrics of the application services to generate a set of candidate events that may correlate. 430

Categorize the set of candidate events according to key identifiers of the respective events to reconstruct events of an application flow according to previously known flow facts. 440

Reconstruct an application topology using the reconstructed application flow. 450

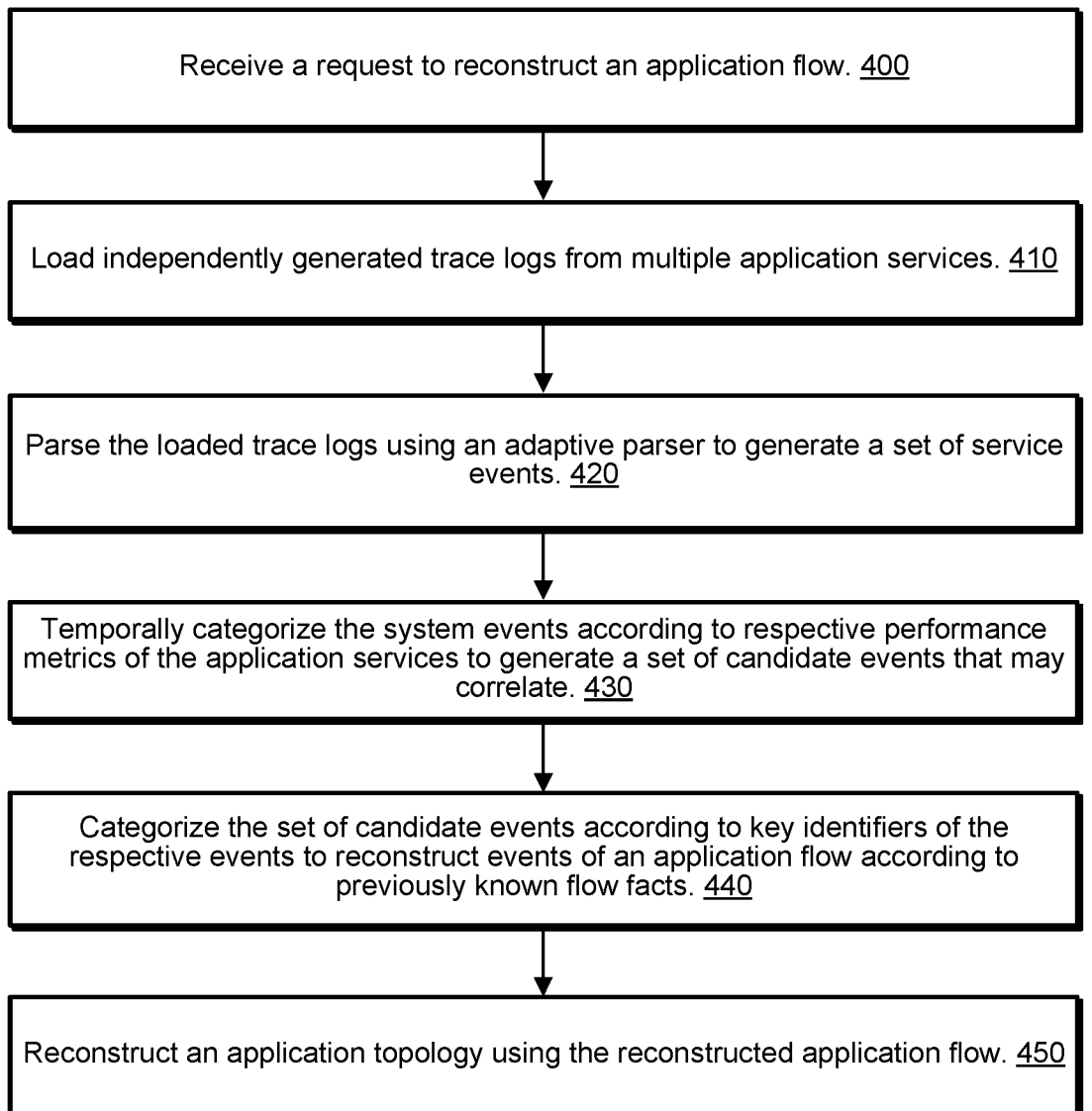

Receive a request to reconstruct an application flow. 400

Load independently generated trace logs from multiple application services. 410

Parse the loaded trace logs using an adaptive parser to generate a set of service events. 420

Temporally categorize the system events according to respective performance metrics of the application services to generate a set of candidate events that may correlate. 430

Categorize the set of candidate events according to key identifiers of the respective events to reconstruct events of an application flow according to previously known flow facts. 440

Reconstruct an application topology using the reconstructed application flow. 450

FIG. 4

RECONSTRUCTIVE INTROSPECTION OF APPLICATION FLOWS

BACKGROUND

Applications leveraging large scale network-based services, along with the systems that provide those applications and services, may evolve to incorporate complex interactions of a scale beyond straightforward analysis and understanding. As a result, optimizing, configuring and maintaining such systems may become problematic as introspection of these interactions becomes increasingly challenging with scale. Furthermore, as a provider network may provide hundreds of such services, often with countless interdependencies, application flows may become hopelessly opaque. Unfortunately, the same scaling issues that lead to such introspection challenges also present massive challenges to instrumentation and debugging, as adding even the most basic tracing information for applications may be prohibitive.

BRIEF DESCRIPTION OF THE DRAWINGS

FIG. 4 is a flow diagram illustrating reconstruction of an application flow and topology, according to some embodiments.

Figure 1:
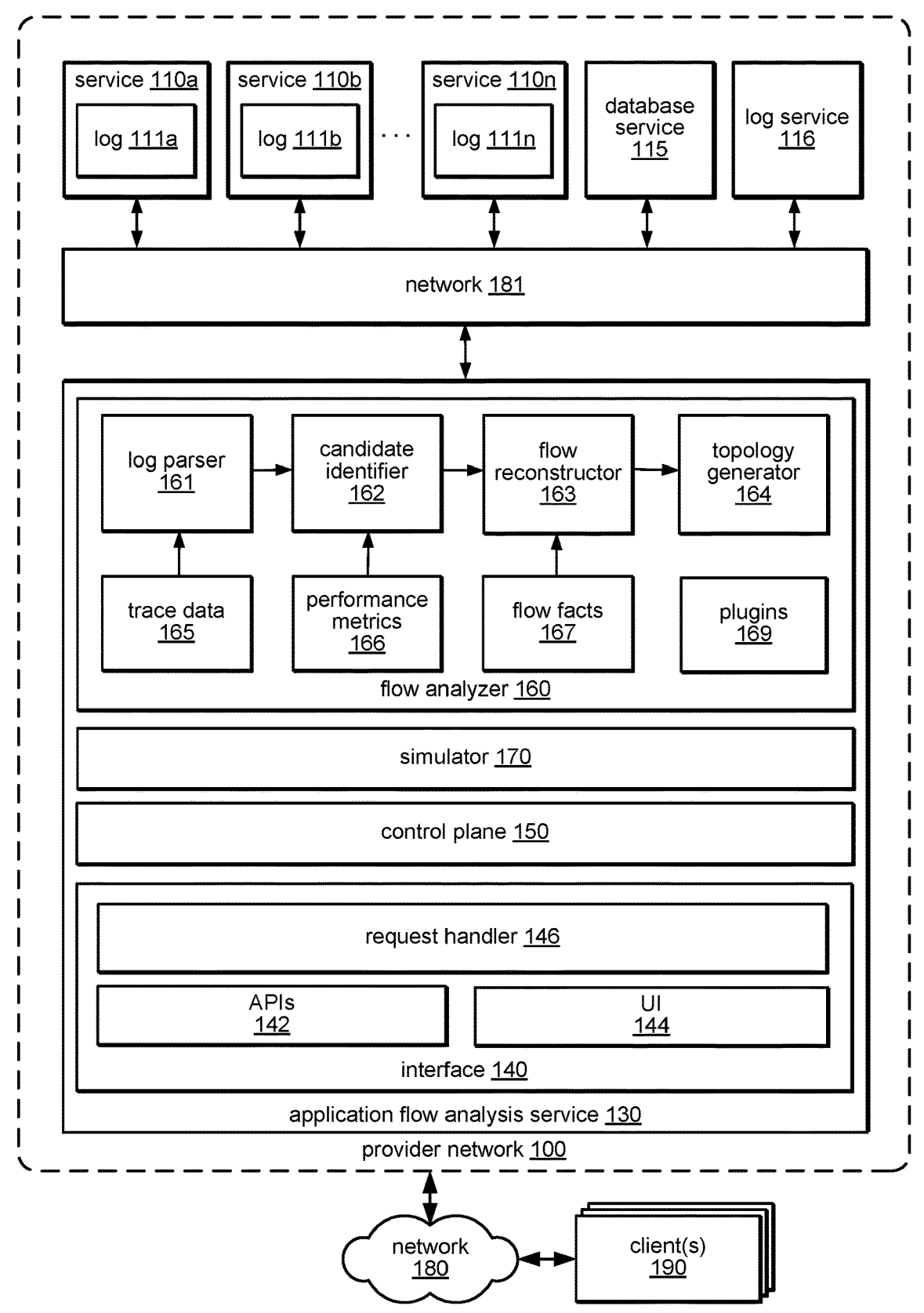
FIG. 1 is a block diagram illustrating a provider network that may implement an application flow analysis service, according to some embodiments.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Cloud-based applications, such as critical business applications, have evolved to leverage large scale network-based services. These applications, along with the systems that provide those them as well as the services they use, develop increasingly complex interactions of a scale beyond straightforward analysis. As a result, developing, debugging, optimizing, configuring and maintaining such systems may become problematic as introspection of these complex interactions becomes increasingly challenging at scale.

Incorporated in this scale, a provider network may provide hundreds of such services, often with countless interdependencies. As a result, application flows may become hopelessly opaque. At the same time, these scaling issues that lead to such introspection challenges also present challenges to instrumentation and debugging, as adding even the most basic tracing information for applications may be prohibitive. Therefore, an introspection tool capable of reconstructing application flows using unmodified or minimally-extended trace logs of network-based services is presented.

Applications using complex interactions among networked services or subsystems may have flows reconstructed through analysis of trace logs of the services. Event logs collected independently and absent knowledge of other logs or flows may be parsed by an adaptive parser to identify service events which may be temporally organized using timestamps and performance metrics collected during previous usage of the services. Analyzing these temporally organized events may produce a list of independent candidate events that may associated with an application flow. These candidate events may then be sorted based on key identifiers in the events according to previously established application facts with identifiers of events correlated to reconstruct the application flow. The reconstructed flow may then be provided for stored, visualized, replayed or provided as input to a topology generator for further introspection.

FIG. 1 is a block diagram illustrating a provider network that may implement an application flow analysis service, according to some embodiments. A provider network 100 may be formed as a number of regions, where a region is a separate geographical area in which the cloud provider clusters data centers. Each region may include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone.

Preferably, availability zones within a region may be positioned far enough away from one other that the same natural disaster should not take more than one availability zone offline at the same time. Users may connect to availability zones of the provider network 100 via a publicly accessible network (e.g., the Internet, a cellular communication network). Regions are connected to a global network which includes private networking infrastructure (e.g., fiber connections controlled by the cloud provider) connecting each region to at least one other region. The provider network 100 may deliver content from points of presence outside of, but networked with, these regions by way of edge locations and regional edge cache servers.

An edge location may be an extension of the cloud provider network outside of the traditional region/AZ context. For example an edge location may be a data center positioned to provide capacity to a set of customers within a certain latency requirement, a set of servers provided to a customer's premises, or a set of servers provided within (or forming part of) a cellular communications network, each of which may be controlled at least in part by the control plane of a nearby AZ or region. This compartmentalization and geographic distribution of computing hardware enables the provider network 100 to provide low-latency resource access to customers on a global scale with a high degree of fault tolerance and stability.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system.

The control plane generally includes one or more control plane components distributed across and implemented by one or more control servers. Control plane traffic generally includes administrative operations, such as system configuration and management (e.g., resource placement, hardware capacity management, diagnostic monitoring, system state information).

The data plane includes customer resources that are implemented on the cloud provider network (e.g., compute instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In some embodiments, provider network 100 may include the hardware (e.g., modems, routers, switches, load balancers, proxy servers, etc.) and software (e.g., protocol stacks, accounting software, firewall/security software, etc.) necessary to establish a networking links between different components of provider network 100, such as computation and storage hosts, control plane components as well as external networks, such as network (e.g., the Internet). In some embodiments, provider network 100 may employ an Internet Protocol (IP) tunneling technology to provide an overlay network via which encapsulated packets may be passed through the internal network using tunnels.

The IP tunneling technology may provide a mapping and encapsulating system for creating an overlay network and may provide a separate namespace for the overlay layer and the internal network layer. Packets in the overlay layer may be checked against a mapping directory to determine what their tunnel target should be. The IP tunneling technology provides a virtual network topology; the interfaces that are presented to clients, such as clients 190 in FIG. 1, may be attached to the overlay network so that when a client provides an IP address that they want to send packets to, the IP address is run in virtual space by communicating with a mapping service that knows where the IP overlay addresses are.

Figure 2:
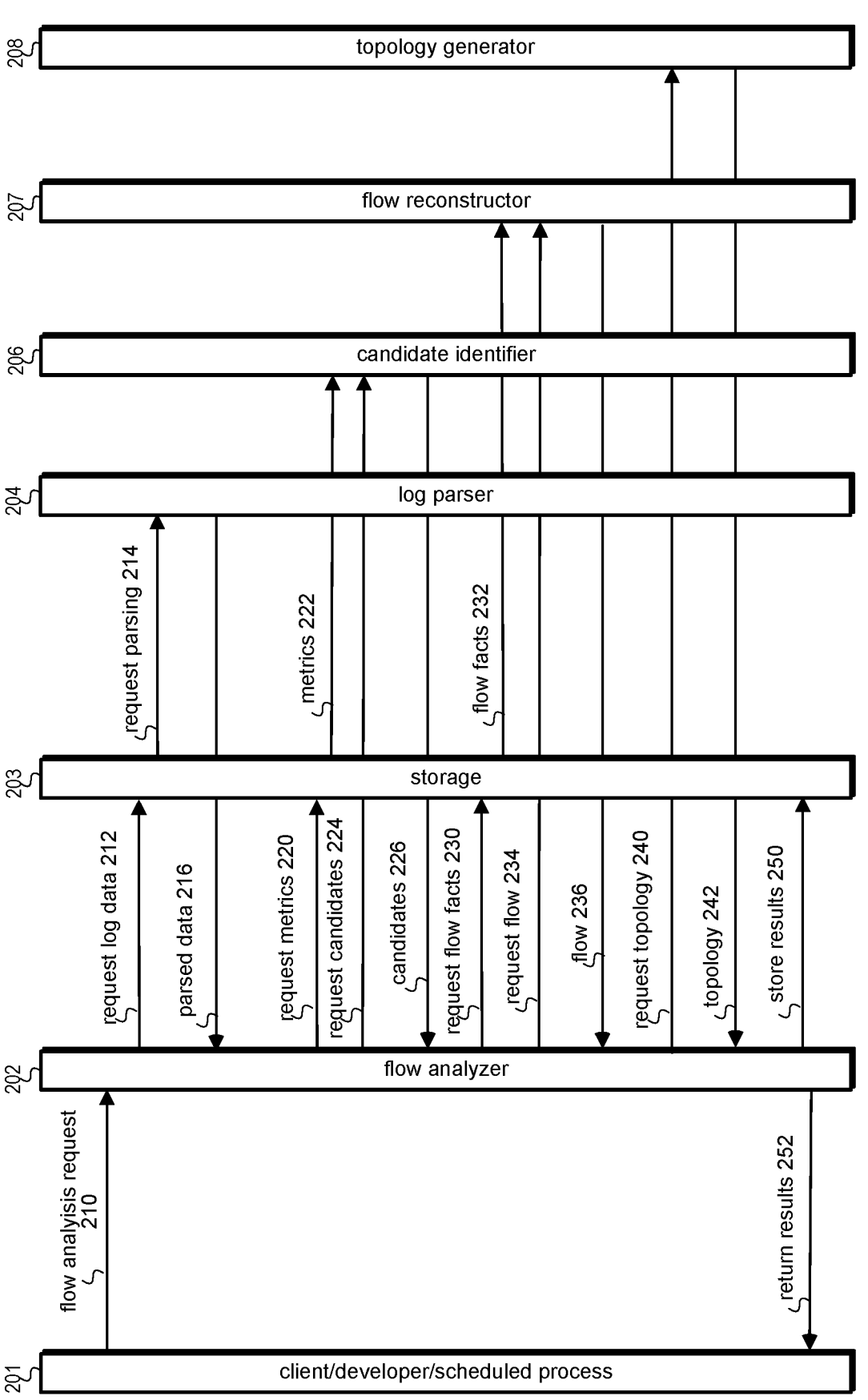
FIG. 2 illustrates example interactions implementing reconstruction of an application flow and topology, according to some embodiments.
Figure 3:
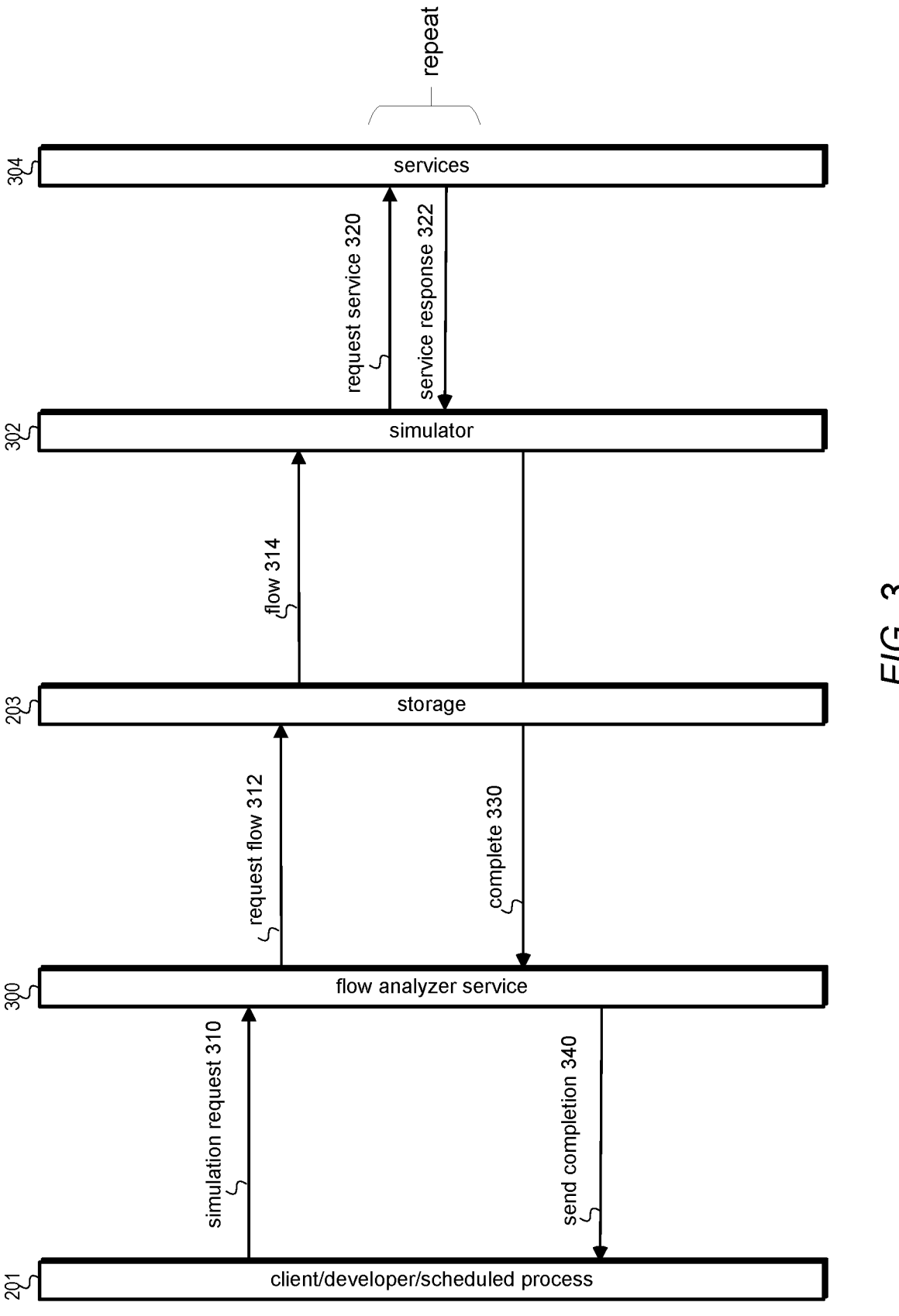
FIG. 3 illustrates example interactions implementing simulation of a reconstructed application flow, according to some embodiments.

Provider network 100 may implement many services or subsystems, such as services 110*a*-110*n*, 115 and 116 that provide various types of computing, storage, management, network, or other services over public network and within the provider network via network 181. As discussed in detail with regard to FIGS. 2-4, provider network 100 may implement an application flow analysis service 130 that enables developers and clients to develop, debug, optimize, configure, maintain and instrument applications and processes as part of a team or organization. Various features of the application flow analysis service 130 may enable more clients and developers to deliver efficiently, safely, and quickly. Application flow analysis service 130 may offer various tools and capabilities (as well as allowing developers to add, adapt or implement further tools via plugins 169) that developers need to accomplish their tasks. As developers continue to use the tools of application flow analysis service 130, various features may support the integration of development projects with a developing organization's standards, expanding the usage to more and more teams of the organization.

Application flow analysis service 130 may, in some embodiments, provide a web client that lives outside provider network 100's management console, a developer identity and authorization system that supports both individual and workforce identities, and an end-to-end developer toolchain that improves on existing solutions in terms of breadth and by making it easy for developers to successfully achieve software development velocity and quality at scale due to the extensibility and scalability offered by system features.

Application flow analysis service 130 may utilize various tools and other services as building blocks to provide core functionality and a web UI to deliver a unified end-to-end experience. Some features of application flow analysis service 130 will allow developers to centralize management of their software development projects, including access control, easy implementation of software development life cycle (SDLC) best practices, auditing, and software provenance tracking. The set of capabilities provided by these features may include the ability to execute workflows, define and enforce best practices, and track compliance.

Application flow analysis service 130 may provide centralized data management and change control systems, which may standardize and simplify how data is shared between systems owned by different teams. This should allow the overall experience to feel more unified regardless of our organization's structure, while also simplifying the implementation of features that were historically difficult to build, such as a "track changes" view with near-real-time updates from across the toolchain, or a personalized activity dashboard that spans product areas.

Application flow analysis service 130 may implement interface 140 which may include various features for interacting including Application Programming Interfaces (APIs) 142, a User Interface (UI) 144 and request handler 146. For example, APIs 142 may be implemented as a Software Development Kit (SDK) which may include operations to create, read, update, and/or delete various documents which are authored as part of application flow analysis service 130. User interface (UI) 144 may be a web, or other graphically based, development environment that allows for various features, including leveraging a micro-front-end framework for packaging and routing client-side applications Text searches, as well as updates that cause index updates may be received or performed through APIs 142 and/or other user interfaces of application flow analysis service 130.

Control plane 150 may be implemented as part of application flow analysis service 130 and may include flow analyzer 160 and simulator 170. Flow analyzer 160 may, via request from request handler 146, analyze trace or event logs 111*a*-111*n* generated by the various services 110*a*-110*n* according to performance metrics 166 and flow facts 167 to reconstruct application flows from constituent events. Simulator 170 may, via request from request handler 146, replay such reconstructed application flows by recreating those constituent events.

Services 110 may be communicatively coupled directly over a network to one another or indirectly through storage services such as database service 115. Applications configured and executed by clients 190 may uses these services to implement various processes such as commerce applications including sales, accounting, billing, and so on. However, commerce applications are merely examples where application flow analysis service 130 may be useful and any number of applications may be envisioned.

Services 110 may implement tracing using event logs 111. These trace logs may provide insight to the functioning of the individual services but collectively they may be analyzed to reconstruct event relationships across the logs to provide tracing entire application flows without modification to individual logging functions. Due to problems of scale, modification to such trace logging for myriad services of a provider network 100 may be impractical, making analysis of native service logs essential.

Services 110 may directly or indirectly couple with other services, making observation of an application topology not easily observable. An example of indirect couple may be through the use of shared files. For example, a first service 110*a* may write data to a file stored on a storage services such as the database service 115. This file may be subsequently read by a second service 110*b*. While services 110*a* and 110*b*, as well as database service 115, may include events describing accesses to this shared file, no individual log may contain information associating the file with a particular application flow or with other services.

Services 110 may maintain logs 111 including data as desired by developers of those services. In addition, the formats of the individual logs may follow any number of formats. Furthermore, individual services 110 may store logs 111 locally or remotely using data storage or using a log service 116.

While logs 111 of respective services 110 may each implement a proprietary format, some services may implement a common format. For example, services 110 may use a log service 116 to implement trace logging, with the log service 116 providing a standard logging format. In another example, services 110 may be implemented using a common language, such as the Java™ programming language, that includes a logging API providing standardization of logging format. As a result, to process a collection of unrelated logs, the flow analyzer 160 may include an adaptive log parser 161 that may be extensible using plugins 169. In some embodiments, the log parser 161 may implement parsing of event logs of one or more standard formats while in other embodiments, machine learning techniques may be employed to allow adaptive parsing of logs through inference. These parsing techniques, however, are merely examples and are not intended to be limiting.

To identify an application flow, trace data 165 may be processed by the log parser 161 to identify service events. Trace data 165 may be obtained directly from logs 111 stored at individual services 110, from storage services or from log services 116, in various combinations. The resulting service events may include respective system-wide timestamps allowing the flow analyzer 160 to reconstruct event timing across application flows and provider network services. Additionally, service events may include one of more key identifiers. While these identifiers may be shared among events with a service or within a limited number of services, key identifiers may not be assumed to be consistent across arbitrary services and application flows. It should be noted that key identifiers may not be shared across services intentionally for security purposes.

In addition to logging of events, individual services 110 may also log or generate various performance metrics and provide these metrics either via private APIs, through their logs 111, or through any number of other means. Collectively, these performance metrics may for performance metrics 166. A candidate identifier 162 may take the system events generated by the log parser 161 and process them temporally using system-wide timestamps and performance metrics 166 to generate candidate events that may correlate with a specific application flow. For example a network request and response logged at two services may identify a particular network request and associate the two services through the use of matching timestamps. Performance metrics may be useful to characterize processing performance and usage of individual services. For example, performance metrics may indicate a typical response time for a request, with increasing latencies or timestamp differences indicating decreasing likelihoods of correlations between service events.

Candidate events may then be provided to a flow reconstructor 163 which may then identify likely event correlations using the temporal categorization provided by the candidate identifier 162. Flow reconstructor 163 may perform this reconstruction with the aid of flow facts 167. Flow facts 167 may include data that may describe some previously known aspects of particular application flows. For example, an application may be built using network-based services 110 of a provider network 130 through the use an application development service (not shown) which may provide, in addition to the application, various information regarding application topology. This information may then be incorporated into flow facts 167. This, however, is merely one example contributing to flow facts and any number of other sources of flow facts may be envisioned.

A result of the flow reconstructor 163 may be a reconstructed application flow described by a series of correlated system events. This application flow may be stored in the database service 115 for later recall. The flow may also be returned to the request handler 146, where visualization of the flow may be provided to a client 190 via the UI 144. This visualization may be further extended with service or domain specific information through the use of plugins 169.

The flow may be present to a client 190 in a textual form. As reconstruction of application flows may not always be complete due to security measures interfering with correlation of system events, in some embodiments the flow reconstructor 163 may provide estimations of likely flows of events where gaps in traceability exist. Over time and with repeated reconstructions, gaps in traceability may be reduced, in some embodiments through the use of improving flow facts 167.

In addition, the flow may be provided to a topology generator 164 which may use the flow to construct all or portions of an application topology which may then be stored at the database service, presented to a client 190 via UI 144, or integrated into flow facts 167, in various embodiments.

A simulator 170 may access generated application flows stored in the database service 115 to play back sequences of service events in order to simulate application flows during testing of various services of the provider network 100.

A document-oriented control plane 150 helps application flow analysis service 130 provide a uniform layer where application flows may be reconstructed through analysis of application events using existing service event logs.

FIG. 2 illustrates example interactions implementing reconstruction of an application flow and topology, according to some embodiments. A flow analysis request 210 may be received at a flow analyzer 210, such as the flow analyzer 160 of FIG. 1, in some embodiments. This request may be made from a variety of sources 201, such as by a client as part of a visualization request, by a developer as part of a development or debugging process or as a scheduled process of a provider network configuration. These examples are not intended to be limiting and any number of request sources may be envisioned.

Responsive to the request, the flow analyzer 202 may request log data 210, such as the trace data 165 of FIG. 1, to be read from storage 203, such as the logs 111 or the database service 115 of FIG. 1, and presented as a parsing request 214 to a log parser 204, such as the log parser 161 of FIG. 1, in some embodiments. In some embodiments, the log parser 204 may implement parsing of event logs of one or more standard formats while in other embodiments, machine learning techniques may be employed to allow adaptive parsing of logs through inference. These parsing techniques, however, are merely examples and are not intended to be limiting.

Parsed data may generate system events which may include respective system-wide timestamps allowing the flow analyzer 202 to reconstruct event timing across application flows and provider network services. Additionally, the service events may include one of more key identifiers. While these identifiers may be shared among events with a service or within a limited number of services, key identifiers may not be assumed to be consistent across arbitrary services and application flows. It should be noted that key identifiers may not be shared across services intentionally for security purposes. These system events that may then be returned 216 to the flow analyzer, in some embodiments.

The flow analyzer 202 may then request performance metrics 220, such as the performance metrics 166 as shown in FIG. 1, from storage 203. These performance metrics may be provided 222 along with a request to generate event candidates 224 to a candidate identifier 206, such as the candidate identifier 162 of FIG. 1, in some embodiments. The candidate identifier 206 may take the system events generated by the log parser 204 and process them temporally using system-wide timestamps and performance metrics to generate candidate events that may correlate with a specific application flow.

For example a network request and response logged at two services may identify a particular network request and associate the two services through the use of matching timestamps. Performance metrics may be useful to characterize processing performance and usage of individual services, in some embodiments. For example, performance metrics may indicate a typical response time for a request, with increasing latencies or timestamp differences indicating decreasing likelihoods of correlations between service events. Identified candidate events may then be returned 226 to the flow analyzer 202.

The flow analyzer 202 may then request flow facts 230, such as the flow facts 167 as shown in FIG. 1, from storage 203. The requested flow facts may include data that may describe some previously known aspects of particular application flows. For example, an application may be built using network-based services, such as the services 110 as shown in FIG. 1, of a provider network, such as the provider network 130 of FIG. 1, through the use an application development service which may provide, in addition to the application, various information regarding application topology. This information may then be incorporated into flow facts. This, however, is merely one example contributing to flow facts and any number of other sources of flow facts may be envisioned.

The candidate events may then be provided to a flow reconstructor 207, such as the flow reconstructor 163 of FIG. 1, along with the flow facts to request a reconstructed flow 234, in some embodiments. The flow reconstructor 207 may then identify likely event correlations using the temporal categorization provided by the candidate identifier 206. Flow reconstructor 207 may perform this reconstruction with the aid of the provided flow facts. As reconstruction of application flows may not always be complete due to security measures interfering with correlation of system events, in some embodiments the flow reconstructor 163 may provide estimations of likely flows of events where gaps in traceability exist. Over time and with repeated reconstructions, gaps in traceability may be reduced, in some embodiments through the use of improving flow facts 167.

A result of the flow reconstructor 207 may be a reconstructed application flow described by a series of correlated system events. The reconstructed flow may be returned to the flow analyzer 202, where the flow may be provided to the requestor 252. In addition, the reconstructed flow may also be stored for later use 250 in storage 203. In some embodiments, the reconstructed flow may be provided as part of a request to construct and application topology 240 sent to a topology generator 208, such as the topology generator 164 as shown in FIG. 1. The topology generator 208 may use the flow to construct all or portions of an application topology which may then be returned 242 to the flow analyzer 202. The resulting topology may then stored 250 at storage 202 or returned to the requestor 252, in various embodiments.

FIG. 3 illustrates example interactions implementing simulation of a reconstructed application flow, according to some embodiments. A simulation request 310 may be received at a flow analyzer service 300, such as the flow analyzer service 130 of FIG. 1, in some embodiments. This request may be generated from a variety of sources, such as by a developer as part of a development or debugging process. This example is not intended to be limiting and any number of request sources may be envisioned.

The flow analyzer service 300 may then an application flow 312 from storage 203 and provide the requested flow to a simulator 302, such as the simulator 170 of FIG. 1, in some embodiments. The simulator may then request a repetitive sequence of service requests to various services 304, such as the services 110 of FIG. 1, timed according to respective timestamps within the application flow. It should be noted that some service requests may be internally generated by other services in response to previously submit service requests made by the simulator 302, therefore the simulator may only request a portion of service events described in the application flow, in some embodiments. Upon completion of a service request, a service 304 may return a response to the simulator 302, in some embodiments.

Upon completion of the requested simulation, the simulator 302 may return a completion message 330 to the flow analyzer service 300. The flow analyzer service 300 may then send a completion message 340 to the requestor 201, in some embodiments.

FIG. 4 is a flow diagram illustrating reconstruction of an application flow and topology, according to some embodiments. The process begins at 400 where a request to reconstruct an application flow may be received. This request may be made from a variety of sources, such as shown in 201 of FIG. 2. The request may be made by a client as part of a visualization request, by a developer as part of a development or debugging process or as a scheduled process of a provider network configuration. These examples are not intended to be limiting and any number of request sources may be envisioned.

Responsive to the request, as shown in 410 independently generated trace logs of multiple services, such as the logs 111 or the database service 115 of FIG. 1, may be loaded from storage, such as shown in 212 of FIG. 2. As shown in 420, these loaded trace logs may then be parsed using an adaptive log parser, such as the log parser 161 of FIG. 1, in some embodiments. In some embodiments, the log parser 204 may implement parsing of event logs of one or more standard formats while in other embodiments, machine learning techniques may be employed to allow adaptive parsing of logs through inference. These parsing techniques, however, are merely examples and are not intended to be limiting.

Parsed data may generate system events which may include respective system-wide timestamps allowing a flow analyzer to reconstruct event timing across application flows and provider network services. Additionally, the service events may include one of more key identifiers. While these identifiers may be shared among events with a service or within a limited number of services, key identifiers may not be assumed to be consistent across arbitrary services and application flows. It should be noted that key identifiers may not be shared across services intentionally for security purposes.

As shown in 430, the system events derived from the logs may then be temporally categorized by a candidate identifier, such as the candidate identifier 162 of FIG. 1, according to performance metrics, such as the performance metrics 166 of FIG. 1, to generate candidate events that, while independent, may correlate with a reconstructed application flow. For example a network request and response logged at two services may identify a particular network request and associate the two services through the use of matching timestamps. Performance metrics may be useful to characterize processing performance and usage of individual services, in some embodiments. For example, performance metrics may indicate a typical response time for a request, with increasing latencies or timestamp differences indicating decreasing likelihoods of correlations between service events.

As shown in 440, the candidate events may then be categorized according to key identifiers by a flow reconstructor, such as the flow reconstructor 163 as shown in FIG. 1, in some embodiments. This reconstruction may be performed with the assistance of previously known flow facts, such as the flow facts 167 as shown in FIG. 1, in some embodiments. These flow facts may include data that may describe some previously known aspects of particular application flows. For example, an application may be built using network-based services, such as the services 110 as shown in FIG. 1, of a provider network, such as the provider network 130 of FIG. 1, through the use an application development service which may provide, in addition to the application, various information regarding application topology. This information may then be incorporated into flow facts. This, however, is merely one example contributing to flow facts and any number of other sources of flow facts may be envisioned.

The flow reconstructor may then identify likely event correlations using the temporal categorization provided by the candidate identifier 206. As reconstruction of application flows may not always be complete due to security measures interfering with correlation of system events, in some embodiments the flow reconstructor 163 may provide estimations of likely flows of events where gaps in traceability exist. Over time and with repeated reconstructions, gaps in traceability may be reduced, in some embodiments through the use of improving flow facts.

A result of the flow reconstructor may be a reconstructed application flow described by a series of correlated system events. The reconstructed flow may be returned In some embodiments, as shown in 450 the reconstructed flow may be further used to construct and application topology 240 through a topology generator, such as the topology generator 164 as shown in FIG. 1. The topology generator may use the reconstructed flow to construct all or portions of an application topology.

Figure 5:
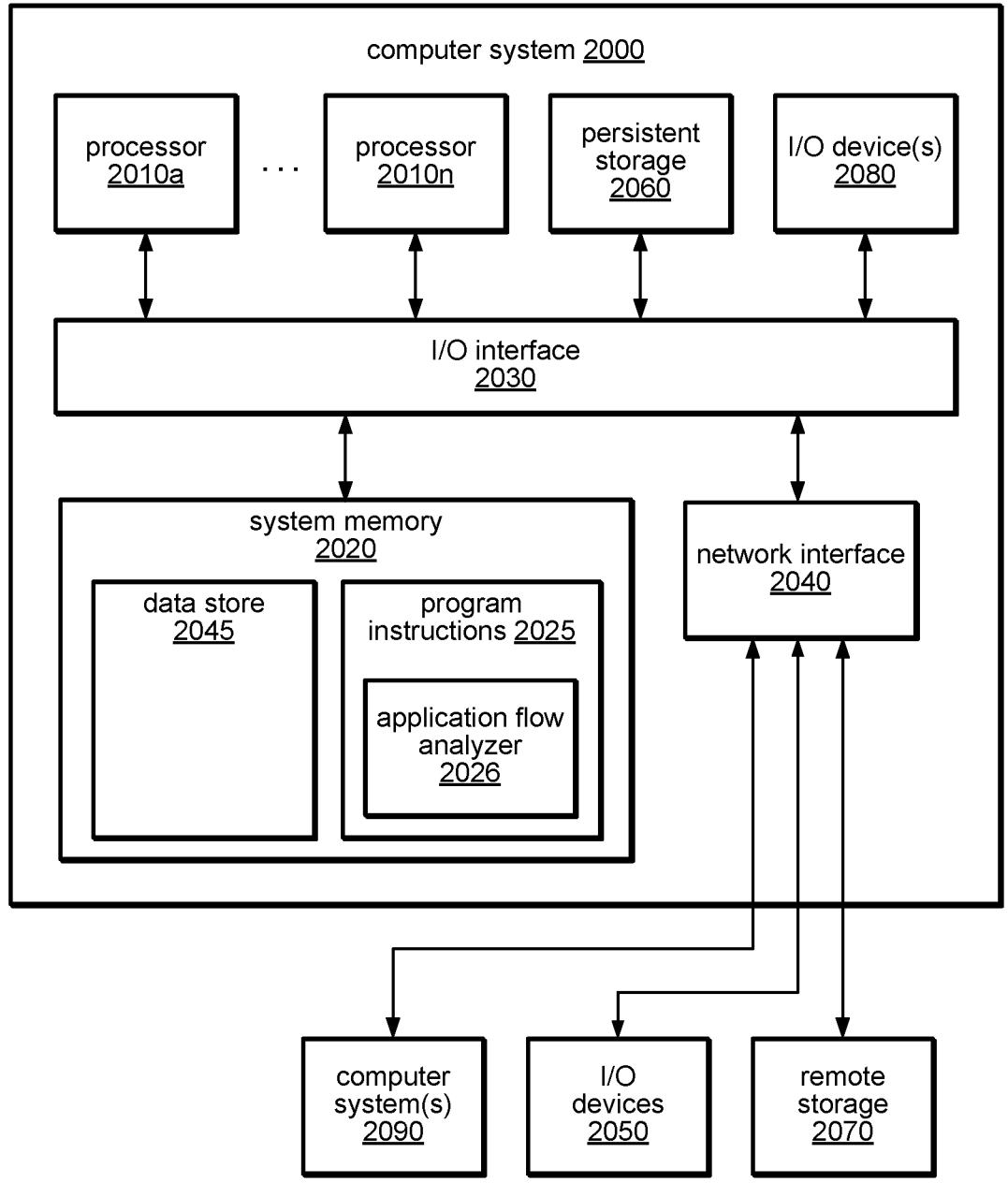
FIG. 5 is a block diagram illustrating an example computer system, according to various embodiments.

Any of various computer systems may be configured to implement processes associated with a technique for multi-region, multi-primary data store replication as discussed with regard to the various figures above. FIG. 5 is a block diagram illustrating one embodiment of a computer system suitable for implementing some or all of the techniques and systems described herein. In some cases, a host computer system may host multiple virtual instances that implement the servers, request routers, storage services, control systems or client(s). However, the techniques described herein may be executed in any suitable computer environment (e.g., a cloud computing environment, as a network-based service, in an enterprise environment, etc.).

Various ones of the illustrated embodiments may include one or more computer systems 2000 such as that illustrated in FIG. 5 or one or more components of the computer system 2000 that function in a same or similar way as described for the computer system 2000.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030. In some embodiments, computer system 2000 may be illustrative of servers implementing enterprise logic or downloadable applications, while in other embodiments servers may include more, fewer, or different elements than computer system 2000.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the embodiments described herein. In another example, an instance of a server application executing on computer system 2000 may use network interface 2040 to communicate with other instances of the server application (or another server application) that may be implemented on other computer systems (e.g., computer systems 2090).

System memory 2020 may store instructions and data accessible by processor 2010. In various embodiments, system memory 2020 may be implemented using any suitable memory technology, such as static random-access memory (SRAM), synchronous dynamic RAM (SDRAM), non-volatile/Flash-type memory, or any other type of memory. In the illustrated embodiment, program instructions and data implementing desired functions, such as those methods and techniques as described above for an application flow analyzer as indicated at 2026, for the downloadable software or provider network are shown stored within system memory 2020 as program instructions 2025. In some embodiments, system memory 2020 may include data store 2045 which may be configured as described herein.

In some embodiments, system memory 2020 may be one embodiment of a computer-accessible medium that stores program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 2000 via I/O interface 2030. A computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

In one embodiment, I/O interface 2030 may coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may allow data to be exchanged between computer system 2000 and other devices attached to a network, such as between a client device and other computer systems, or among hosts, for example. In particular, network interface 2040 may allow communication between computer system 800 and/or various other device 2060 (e.g., I/O devices). Other devices 2060 may include scanning devices, display devices, input devices and/or other communication devices, as described herein. Network interface 2040 may commonly support one or more wireless networking protocols (e.g., Wi-Fi/IEEE 802.7, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, I/O devices may be relatively simple or "thin" client devices. For example, I/O devices may be implemented as dumb terminals with display, data entry and communications capabilities, but otherwise little computational functionality. However, in some embodiments, I/O devices may be computer systems implemented similarly to computer system 2000, including one or more processors 2010 and various other devices (though in some embodiments, a computer system 2000 implementing an I/O device 2050 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 2000. In general, an I/O device (e.g., cursor control device, keyboard, or display(s) may be any device that can communicate with elements of computing system 2000.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein.

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Embodiments of decentralized application development and deployment as described herein may be executed on one or more computer systems, which may interact with various other devices. FIG. 5 is a block diagram illustrating an example computer system, according to various embodiments. For example, computer system 2000 may be configured to implement nodes of a compute cluster, a distributed key value data store, and/or a client, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of compute node, computing node, or computing device.

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may be a storage host, and persistent storage 2060 may include the SSDs attached to that server node.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:

one or more processors and a memory storing program instructions that, when executed on the one or more processors, implement a trace collector configured to reconstruct an application flow, wherein to reconstruct the application flow the trace collector is configured to:

analyze, to identify a plurality of events, respective independently generated event logs of a plurality of interconnected services including a first service and a second service, wherein individual ones of the plurality of events respectively comprise a timestamp and a plurality of identifiers defining a context of the respective event, wherein a first identifier defining a context of a first event from the first service is different from a second identifier defining a context of a second event from the second service, and wherein the respective ones of the trace logs individually comprise:

timestamps for respective ones of a plurality of entries;

identifiers of the respective interconnected services collecting the respective event logs; and identifiers of one or more artifacts associated with a context for respective ones of a plurality of entries;

sort individual ones of the plurality of events according respective timestamps to identify candidate events of the application flow;

categorize individual ones of the candidate events according to key identifiers including the first identifier and second identifier;

identify the first identifier as matching the second identifier based at least in part on the categorizing and on additional information for the application flow, the additional information obtained independent of the respective event logs and different from the respective timestamps and respective pluralities of identifiers of the individual event logs; and report, to a client, the reconstructed application flow comprising the first event and the second event.

2. The system of claim 1, wherein at least one log of the respective event logs is formatted in an unknown format, and wherein analyzing the at least one log is performed using inferences derived from the at least one log according to a machine learning model.

3. The system of claim 1, wherein the trace collector is further configured to:

reconstruct an application topology according to the matched first identifier and second identifier; and report the reconstructed application topology to the client.

4. The system of claim 1, wherein the plurality of interconnected services is provided by a service provider network, and wherein reconstructing the application flow is performed by an analysis service of the provider network.

5. A method, comprising:

analyzing, to identify a plurality of events, respective independently generated event logs of a plurality of interconnected services including a first service and a second service, wherein individual ones of the plurality of events respectively comprise a timestamp and a plurality of identifiers defining a context of the respective event, wherein a first identifier defining a context of a first event from the first service is different from a second identifier defining a context of a second event from the second service;

sorting individual ones of the plurality of events according respective timestamps to identify candidate events of the application flow;

categorizing individual ones of the candidate events according to key identifiers including the first identifier and second identifier;

identifying the first identifier as matching the second identifier based at least in part on the categorizing and on additional information for the application flow, the additional information obtained independent of the respective event logs and different from the respective timestamps and respective pluralities of identifiers of the individual event logs; and reporting, to a client, a reconstructed application flow comprising the first event and the second event.

6. The method of claim 5, wherein at least one log of the respective trace logs is formatted in an unknown format, and wherein analyzing the at least one log is performed using inferences derived from the at least one log according to a machine learning model.

7. The method of claim 5, wherein individual ones of the plurality of interconnected services are communicatively coupled to other ones of the plurality of interconnected services via respective network connections.

8. The method of claim 5, wherein individual ones of the plurality of interconnected services are communicatively coupled to other ones of the plurality of interconnected services via shared files.

9. The method of claim 5, further comprising collecting, by individual ones of the plurality of interconnected services, respective ones of the trace logs, wherein the respective ones of the trace logs individually comprise:

timestamps for respective ones of a plurality of entries;

identifiers of the respective interconnected services collecting the respective trace logs; and identifiers of one or more artifacts associated with a context for respective ones of a plurality of entries.

10. The method of claim 5, wherein sorting individual ones of the plurality of events according respective timestamps is based at least in part on performance metrics of the respective interconnected services.

11. The method of claim 5, further comprising:

reconstructing an application topology according to the matched first identifier and second identifier; and reporting the reconstructed application topology to the client.

12. The method of claim 5, wherein the plurality of interconnected services is provided by a service provider network, and wherein the method is performed by an analysis service of the service provider network.

13. One or more non-transitory computer-accessible storage media storing program instructions that when executed on or across one or more computing devices cause the one or more computing devices to reconstruct a process flow, comprising:

analyzing, to identify a plurality of log entries, respective independently generated event logs of a plurality of interconnected subsystems including a first subsystem and a second subsystem, wherein individual ones of the plurality of log entries respectively comprise a timestamp and a plurality of identifiers defining a context of the respective log entry, wherein a first identifier defining a context of a first log entry from the first subsystem is different from a second identifier defining a context of a second log entry from the second subsystem;

sorting individual ones of the plurality of log entries according respective timestamps to identify candidate log entries of the process flow;

categorizing individual ones of the candidate log entries according to key identifiers including the first identifier and second identifier;

identifying the first identifier as matching the second identifier based at least in part on the categorizing and on additional information for the application flow, the additional information obtained independent of the respective event logs and different from the respective timestamps and respective pluralities of identifiers of the individual event logs; and reporting, to a client, the reconstructed process flow comprising the first log entry and the second log entry.

14. The one or more non-transitory computer-accessible storage media of claim 13, wherein at least one log of the respective event logs is formatted in an unknown format, and wherein analyzing the at least one log is performed using inferences derived from the at least one log according to a machine learning model.

15. The one or more non-transitory computer-accessible storage media of claim 13, wherein reconstructing the process flow further comprises collecting, by individual ones of the plurality of interconnected subsystems, respective ones of the event logs, wherein the respective ones of the event logs individually comprise:

timestamps for respective ones of a plurality of entries;

identifiers of the respective interconnected subsystems collecting the respective event logs; and identifiers of one or more artifacts associated with a context for respective ones of a plurality of entries.

16. The one or more non-transitory computer-accessible storage media of claim 13, wherein sorting individual ones of the plurality of log entries according respective timestamps is based at least in part on performance metrics of the respective interconnected subsystems.

17. The one or more non-transitory computer-accessible storage media of claim 13, wherein reconstructing the process flow further comprises:

reconstructing a process topology according to the matched first identifier and second identifier; and reporting the reconstructed process topology to the client.

18. The one or more non-transitory computer-accessible storage media of claim 13, wherein the plurality of interconnected subsystems is provided by a service provider network, and wherein reconstructing the process flow is performed by an analysis service of the service provider network.

* * * * *